United States Patent
Nikolich

Patent Number: 5,986,562
Date of Patent: Nov. 16, 1999

[54] RFID TAG HOLDER FOR NON-RFID TAG

[75] Inventor: Aleksa D. Nikolich, Shorewood, Wis.

[73] Assignee: Brady Worldwide, Inc., Milwaukee, Wis.

[21] Appl. No.: 09/151,416

[22] Filed: Sep. 11, 1998

[51] Int. Cl.[6] ................................ H04Q 1/02; H04Q 7/06
[52] U.S. Cl. .................................... 340/693.5; 340/572.7; 340/572.8; 340/573.1; 340/693.6; 340/825.54
[58] Field of Search ............................ 340/572.8, 572.7, 340/825.54, 573.1, 693.5, 693.6

[56] References Cited

U.S. PATENT DOCUMENTS

| | | | |
|---|---|---|---|
| 4,262,632 | 4/1981 | Hanton et al. | 119/51.02 |
| 4,854,328 | 8/1989 | Pollack | 128/903 |
| 4,857,716 | 8/1989 | Gombrich et al. | 235/375 |
| 5,172,110 | 12/1992 | Tiefengraber | 340/573.1 |
| 5,317,309 | 5/1994 | Vercellotti et al. | 340/825.54 |
| 5,412,192 | 5/1995 | Hoss | 235/380 |
| 5,450,064 | 9/1995 | Williams, Jr. et al. | 340/574 |
| 5,462,051 | 10/1995 | Oka et al. | 600/300 |
| 5,499,626 | 3/1996 | Willham et al. | 600/300 |
| 5,512,879 | 4/1996 | Stokes | 340/573.4 |
| 5,528,222 | 6/1996 | Moskowitz et al. | 340/572.7 |
| 5,603,094 | 2/1997 | Greear, Jr. | 455/66 |
| 5,608,382 | 3/1997 | Webb et al. | 340/573.4 |
| 5,642,095 | 6/1997 | Cook | 340/568.7 |
| 5,771,001 | 6/1998 | Cobb | 340/573.1 |

*Primary Examiner*—Glen Swann
*Attorney, Agent, or Firm*—Quarles & Brady LLP

[57] ABSTRACT

A tag holder has RFID circuitry and an antenna embedded in a housing. The housing holds a non-RF metal ID tag. The RFID circuitry embedded in the housing is operatively connected to an antenna providing the non-RFID tag with RFID capabilities. The antenna is embedded in the housing and encircles the tag taking advantage of the higher magnetic permeability of the metal tag.

13 Claims, 1 Drawing Sheet

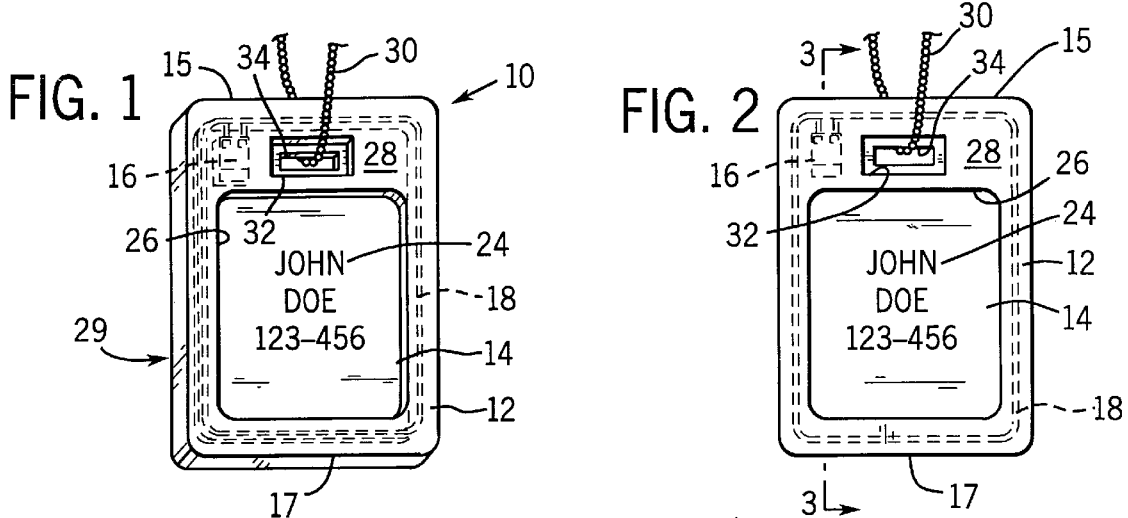
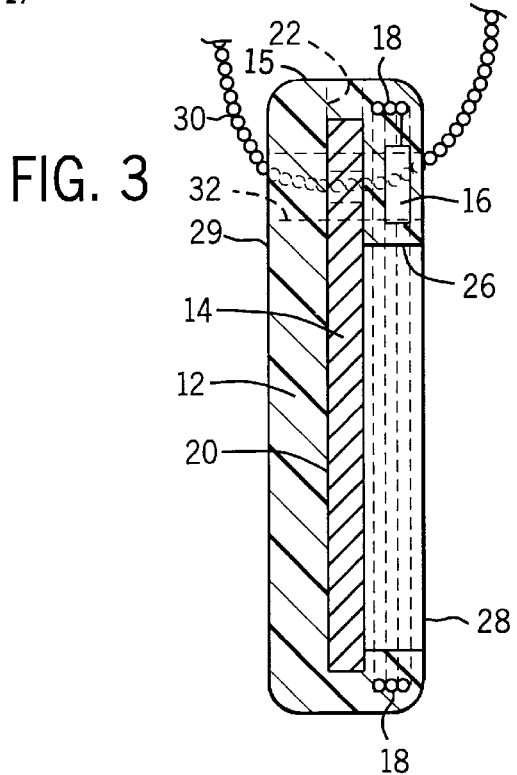
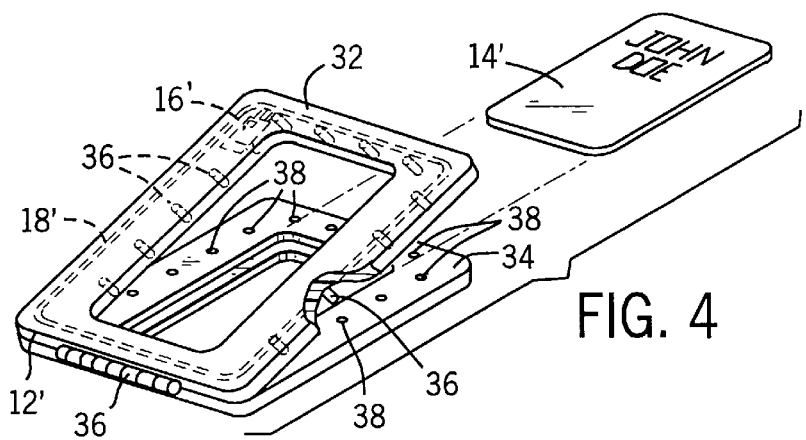

RFID TAG HOLDER FOR NON-RFID TAG

BACKGROUND OF THE INVENTION

The field of invention is radio frequency identification (RFID) tags, more particularly an RFID tag holder for use with non-RFID tags.

Identification (ID) tags are used in many situations, from labeling valves in a chemical plant to identifying soldiers in a battlefield. The ID tags carry printed or embossed data in various forms, such as graphics, photographs, and text providing specific information about the item or person attached to the tag. Because of space limitations, ID tags, such as metal military dog tags and valve tags, typically carry little more than a name and a unique identifying number which must be correlated with a database to obtain any meaningful information about the soldier or valve.

The time delay between reading the unique identifier and obtaining the necessary information can be crucial in certain situations. For example, it would be useful to quickly have a soldier's medical history in a battlefield situation or a model and part number of a failed valve in a chemical plant.

Radio frequency identification (RFID) technology provides the ability to store large amounts of data onto a semiconductor chip in RFID circuitry. The circuitry stores and transmits the data in cooperation with a compatible, conventional RFID reader/writer.

ID cards containing RFID circuitry combined with printed text and graphical images have been developed, such as disclosed in U.S. Pat. Nos. 5,317,309 and 5,528,222. These patents disclose nonmetallic badges and cards having embedded RFID circuitry. However, once the badge becomes obsolete due to a change in the printed text or images, the entire badge must be replaced, wasting the RFID components of the badge. Furthermore, due to magnetic shielding, RFID circuitry and antennae do not operate effectively if embedded in a metal tag, such as used in the military or corrosive environments.

Therefore, there is a need for an effective means to disassociate obsolete printed text and images from the RFID components for reuse on a new or updated badge. There is also a need to provide a metal tag or badge with RFID capabilities.

BRIEF SUMMARY OF THE INVENTION

The present invention is a tag holder having a housing which holds a non-RF ID tag. RFID circuitry embedded in the housing is operatively connected to an antenna providing the non-RFID tag with RFID capabilities. Thus accomplishing a general objective of providing RFID capabilities to a non-RFID tag.

Another objective of the present invention is to provide a non-RFID tag which is separable from RFID capabilities. One aspect of the present invention provides a tag holder having RFID capabilities that is adapted to receive a non-RFID tag. The non-RFID tag is not permanently affixed to the tag holder and can therefore be exchanged with an updated non-RFID tag.

Still another objective of the present invention is to provide a metal tag with RFID capabilities. This is accomplished by providing a tag holder having a coil antenna located around the circumference of a metal tag contained within the holder.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 1 is a perspective view of a tag holder incorporating the present invention;

FIG. 2 is a sectional front view of FIG. 1;

FIG. 3 is a sectional view along line 3—3 of FIG. 2; and

FIG. 4 is a perspective view of an alternative housing.

DETAILED DESCRIPTION OF THE PREFERRED EMBODIMENTS

Referring to FIGS. 1–3, an ID tag holder 10 of generally rectangular shape has a molded housing 12 with a top edge 15, and a bottom 17 edge which join a front wall 28, and a rear wall 29. RFID circuitry 16 and an antenna 18 embedded in the housing provides the tag holder with RFID capabilities. The housing 12 is formed from a polymeric material, such as plastic or rubber, which is easily molded and comfortable to a tag wearer. The front and rear walls 28, 29 are spaced apart to form cavity 20. The cavity 20 forms a pocket that receives a non-RFID tag 14. Preferably, the non-RFID tag 14 slips into the cavity 20 through a slot 22 formed along the top edge 15 of the housing 12. Text 24 or graphics displayed on one side of the non-RFID tag 14 is viewed through a window 26 formed in the housing front wall 28. If desired, an opening (not shown) may also be formed in the housing rear wall 29 to display text or graphics on the flip side of the non-RFID tag 14.

The non-RFID tag 14 is retained in the cavity 20 by friction and is blocked from slipping out of the cavity 20 through the slot 22 by a stop 30. A chain necklace, plastic tie wrap, or the like may perform the function of the stop 30. Preferably, the stop 30 is slipped through an aperture 32 formed through the housing front and rear walls 28, 29 and the aperture 32 is aligned with a hole 34 in the tag 14. Alternatively, the aperture 32 can be formed above the inserted tag 14, thus effectively preventing the tag 14 from slipping through the slot 22.

Although, the present invention provides a non-RFID tag 14 which is separable from the housing 12, the non-RFID tag 14 may also be permanently affixed to the housing 12 by overmolding the housing 12 onto the non-RFID tag 14 or by permanently affixing the non-RFID tag 14 using adhesives, or the like, without departing from the scope of the present invention.

As shown in FIGS. 2 and 3, RFID circuitry 16, such as Phillips MIFARE® RFID integrated circuitry, available from Phillips Semiconductors, a division of Phillips Electronics N.V., Eindhoven, The Netherlands, is embedded in the housing 12 and operatively connected to a coil antenna 18. Preferably, the circuitry 16 is embedded in the polymeric housing to protect it from adverse conditions, however, the circuitry 16 can also be mounted anywhere in or on the housing 12 without affecting the circuitry performance.

The RFID circuitry 16 stores information which can be specific to the tag wearer or tagged device, such as a unique identifier, medical/maintenance records or the like. The information can then be downloaded from the tag holder 10 when needed using a compatible, conventional RFID reader (not shown).

The circuitry 16 does not require a battery or external energy source other than RF energy received by the antenna 18. The RF energy is transmitted by an RF reader specifically adapted to interact with the RF circuitry 16. Once the circuitry 16 is energized by RF energy received through the antenna 18, it responds by transmitting a data stream that is received by the RF reader.

The amount of data that can be stored, and therefore transmitted by the RF circuitry 16 and antenna 18, is proportional to the amount of RF energy that can be received through the antenna 18. Placement of the antenna 18 with respect to metal tags affects the efficiency of the antenna 18. Locating the antenna 18 behind the metal tag reduces the RF energy received through the antenna 18 by the amount of energy absorbed by the tag. Therefore, placement of the antenna 18 is important to the performance of the RFID tag holder 10.

As shown in FIGS. 2 and 3, the antenna coil 18 is formed around the periphery of the holder 10 and encircles the tag 14. Advantageously, this antenna 18 placement utilizes the higher magnetic permeability of the metal tag to reduce the number of coil turns of the antenna 18. This configuration may also enhance antenna reception, thereby increasing the RFID circuitry operational range.

An alternative housing 12', shown in FIG. 4, having RFID circuitry 16' and an antenna 18' as described above is formed from two housing halves 32, 34. The non-RFID tag 14' is interposed between the housing halves 32, 34 which are snapped together retaining the tag 14' in a pocket therebetween. Posts 36 in one housing half 32 are received in corresponding holes 38 in the other housing half 34 holding the halves 32, 34 together forming the assembled housing 12'. The halves 32, 34 can be joined by a hinge 36 providing a clam shell for enclosing the tag 14'.

While there has been shown and described what are at present considered the preferred embodiments of the invention, it will be apparent to those skilled in the art that various changes and modifications can be made therein without departing from the scope of the invention defined by the appended claims. Other applications for the present invention include child tracking, Medic-alert tags, access control, and animal tags.

I claim:

1. A radio frequency identification tag holder for use with a non-radio frequency identification tag, said tag holder comprising:

a housing defining a cavity for receiving said non-radio frequency identification tag;

radio frequency circuitry mounted to said housing; and an antenna mounted to said housing and operatively connected to said radio frequency circuitry, wherein said non-radio frequency identification tag is metal.

2. A radio frequency identification tag holder as in claim 1, wherein said antenna encircles said non-radio frequency identification tag.

3. A radio frequency identification tag holder as in claim 1, wherein said housing has a window for viewing said non-radio frequency identification tag.

4. A radio frequency identification tag holder as in claim 1, wherein said housing includes a slot which enables the non-radio frequency identification tag to be inserted into the cavity.

5. A radio frequency identification tag holder as in claim 1, wherein said housing is formed as two halves, and wherein said non-radio frequency identification tag is interposed between said halves.

6. A radio frequency identification tag holder as in claim 1, wherein said housing is formed of molded plastic.

7. A radio frequency identification tag holder as in claim 1, wherein said radio frequency circuitry is embedded in said housing.

8. A radio frequency identification tag holder as in claim 1, wherein said antenna is embedded in said housing.

9. A radio frequency identification tag holder as in claim 1, wherein said housing is overmolded onto said non-radio frequency identification tag.

10. A radio frequency identification tag holder as in claim 1, wherein said housing is affixed to said non-radio frequency identification tag using an adhesive.

11. A radio frequency identification assembly comprising:

a metal identification tag;

a housing defining a cavity for receiving said tag, a radio frequency circuit embedded in said housing; and an antenna embedded in said housing and formed around the periphery thereof to encircle said tag.

12. A radio frequency identification assembly as in claim 11, wherein said housing has at least one window formed therein for viewing said tag.

13. A radio frequency identification assembly as in claim 11, wherein said housing is formed from molded plastic.

* * * * *